United States Patent [19]

Haltmar et al.

[11] 4,207,946

[45] Jun. 17, 1980

[54] TERTIARY RECOVERY PROCESS

[75] Inventors: Warren C. Haltmar; Elsa S. Lacey, both of Houston, Tex.

[73] Assignee: Texaco Inc., White Plains, N.Y.

[21] Appl. No.: 925,334

[22] Filed: Jul. 17, 1978

[51] Int. Cl.$^2$ ............................................. E21B 43/22
[52] U.S. Cl. ................................... 166/274; 166/273; 252/8.55 D
[58] Field of Search ................. 252/8.55 D; 166/274, 166/273

[56] References Cited

U.S. PATENT DOCUMENTS

| 3,421,582 | 1/1969 | Falgetter | 252/8.55 X |
|---|---|---|---|
| 3,500,923 | 3/1970 | Reisberg | 166/274 |
| 3,749,169 | 7/1963 | Tate | 252/8.55 |
| 3,776,310 | 12/1973 | Norton et al. | 252/8.55 X |
| 3,811,507 | 5/1974 | Flournoy et al. | 252/8.55 X |
| 3,948,783 | 4/1976 | Szabo et al. | 252/8.55 |
| 4,018,278 | 4/1977 | Shupe | 166/252 |
| 4,143,716 | 3/1979 | Kalfoglou et al. | 252/8.55 X |

*Primary Examiner*—Herbert B. Guynn
*Attorney, Agent, or Firm*—Carl G. Ries; Thomas H. Whaley; Walter D. Hunter

[57] ABSTRACT

A process for recovering hydrocarbons from a hydrocarbon-bearing formation penetrated by an injection well and a production well which comprises injecting an aqueous solution of a vinylpyrrolidone polymer into the formation to condition the reservoir, in a first step injecting an aqueous surfactant solution into the formation and recovering hydrocarbons via the said production well. The pretreatment of the formation with the vinylpyrrolidone polymer reduces the consumption or loss of surfactant and thus improves the efficiency of the process. Optionally, after the injection of the aqueous surfactant solution an aqueous drive fluid is injected into the formation.

5 Claims, No Drawings

TERTIARY RECOVERY PROCESS

BACKGROUND OF THE INVENTION

1. Field of the Invention

This invention relates to a process for recovering hydrocarbons from a hydrocarbon-bearing formation. More particularly, this invention relates to a tertiary hydrocarbon-recovery process in which the formation is first treated with a vinylpyrrolidone polymer followed by injection of an aqueous surfactant solution and finally recovering hydrocarbons via the production well. Optionally, an aqueous drive fluid is injected into the formation.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, waterflooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Waterflooding is one of the more widely practiced secondary recovery methods. A successful waterflood may result in recovery of 30–50 percent of the original hydrocarbons left in place. However, generally the application of waterflooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to remove additional gas by diffusion from the in-place oil thus further reducing the already lowered formation oil volume and increasing the viscosity of the oil.

There is a definite need in the art for a water-flooding process in which the disadvantages discussed above are largely eliminated or avoided.

SUMMARY OF THE INVENTION

In the broadest sense this invention relates to a process for recovering hydrocarbons from a hydrocarbon-bearing formation penetrated by an injection well and a production well which comprises:

(a) injecting via an injection well an aqueous solution of a vinylpyrrolidone polymer, (b) injecting an aqueous surfactant solution, and (c) recovering hydrocarbons via the said production well.

Optionally, step (b) above can be followed by injection of a drive fluid such as water or water thickened with a polymer as exemplified by polyacrylamide, a polysaccharide, etc.

Another embodiment of this invention relates to a method of treating a formation and, especially a limestone formation, with an aqeuous solution of a vinylpyrrolidone polymer prior to the operation of a tertiary recovery process.

DETAILED DESCRIPTION OF THE PROCESS

One of the problems associated with surfactant flooding processes is the high consumption of the surfactant as a result of the absorption of such materials in the formation matrix. Consequently, surfactant flooding processes have not found wide acceptance because of the excessive costs of the surfactant per barrel of recovered oil. Surprisingly, it has been found when an aqueous solution of a vinylpyrrolidone polymer is injected into the formation prior to the injection of the aqueous surfactant that the loss of surfactant by adsorption on the formation is substantially reduced.

Water-soluble vinylpyrrolidone polymers useful in the aqueous compositions utilized in the recovery process of this invention include those having recurring units of the formula:

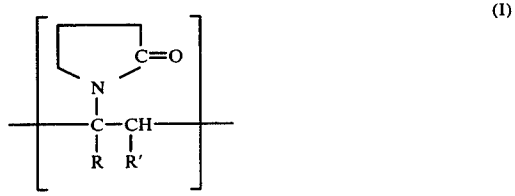

wherein R and R' are independently selected from the group consisting of hydrogen and alkyl radicals having from 1 to 5 inclusive carbon atoms. Examples of alkyl radicals of 1 to 5 inclusive carbon atoms include methyl, ethyl, propyl, butyl, pentyl, and isomeric forms thereof. The sole limitation on the cited structure is that it be sufficiently soluble in the aqueous medium. Likewise, mixtures of these polymers may be employed. When R and R' of Formula I above are both hydrogen, the resulting compound is polyvinylpyrrolidone, i.e., poly-N-vinyl-2-pyrrolidone, which is an especially useful polymer.

Water-soluble copolymers useful in the novel treating compositions are prepared by copolymerizing (A) a compound of the formula:

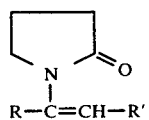

wherein R and R' are independently selected from the group consisting of hydrogen and alkyl radicals having 1 to 5 inclusive carbon atoms and (B) a material selected from the group consisting of acrylamide, acrylic acid and vinyl sulfonic acid. Generally about 75 to about 98 percent by weight of the copolymer will comprise recurring units derived from (A) above. The useful water-soluble copolymers may be prepared by a variety of polymerization techniques well known in the art such as solution copolymerization, slurry copolymerization, etc. utilizing a wide variety of catalysts such as sodium lauryl sulfate, sodium meta-bisulfite, ammonium persulfate, azo-bis-isobutyronitrile, ferrous sulfate heptahydrate, hydrogen peroxide, etc. The vinylpyrrolidone polymers can be prepared in the same manner as described above for the copolymers.

The number average molecular weights of the vinylpyrrolidone polymer and copolymers useful in this invention will vary from about 10,000 to about 1,000,000 or more and, preferably, will range from about 100,000 to about 400,000.

A wide variety of surfactants including the water-soluble petroleum sulfonates may be utilized in the process of this invention. Other useful surfactants include:

(a) polyethoxylated alkyl benzene sulfonates having the formula:

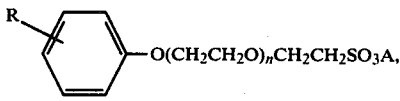

wherein R is alkyl of from 8 to 22 carbon atoms, n is an integer of from 2 to about 10 and A is selected from the group consisting of hydrogen, sodium, potassium and the ammonium ion, (b) polyethoxylated alkyl benzene sulfates having the formula:

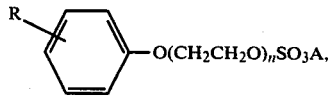

wherein R and A and n have the same meaning as previously described, (c) polyethoxylated alcohol sulfates having the formula:

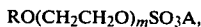

wherein R and A have the same meaning as previously described and m is an integer of from 2 to about 18 and (d) polyethoxylated alcohol sulfonates having the formula:

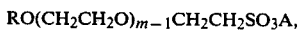

wherein R, m and A have the same meaning as previously described, etc.

Preferably, the aqueous solution of the vinylpyrrolidone polymer of this invention injected into the hydrocarbon-bearing formation will contain dissolved therein about 0.01 to about 10 percent or more by weight of the polymer. Preferably, the aqueous polymer solution will contain about 0.10 to about 4.0 weight percent of the vinylpyrrolidone polymer. Likewise, the weight percent of surfactant dissolved in the aqueous surfactant solution employed in the process of this invention will be from about 0.05 to about 5.0 weight percent or more by weight.

The process of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L. C., *Petroleum Production Engineering-Oil Field Exploitation,* Second Edition, McGraw Hill Book Company, Inc., New York, 1939, and to U.S. Pat. Nos. 3,472,318 and 3,476,182.

It should be understood that the concentration of the polymer may be chosen to provide a displacing fluid of the desired rheological properties. Similarly, the appropriate molecular weight polymer is selected on the basis of the formation being treated as well as other operating conditions employed.

To demonstrate the ability of the polyvinylpyrrolidone polymers to reduce the adsorption of a surfactant on the formation matrix the following experiments were conducted.

A column filled with 80 g of crushed Slaughter core, pore volume of 29 ml., was flushed with 29 mls. of 0.10% solution of sodium petroleum sulfonate (equivalent weight = 415–30) in water which was followed by 46 mls. of water. The first 15 mls. of eluate were discarded, the rest of the eluate was collected and analyzed by a two-phase titration method using bromophenol blue. The eluate was analyzed undiluted by titrating 10 mls. of eluate.

Similar experiments were repeated using as a preflush water solutions of polyvinylpyrrolidone containing 1 and 5 weight percent respectively of the polymer. The titration results were as follows:

| Polyvinyl pyrrolidone concentration - weight percent | mls. of titrant |
| --- | --- |
| 0 | 2.30 |
| 1 | 3.20 |
| 5 | 5.50 |

The volume of the titrant required is directly related to the sulfonate concentration. This data shows that polyvinylpyrrolidone minimizes adsorption of the surfactant and that its effect is concentration dependent.

EXAMPLE I

Through a water injection well drilled into a limestone formation there is first displaced under pressure down the tubing and into the formation at a depth of 8035-8060 about 800 barrels of an aqueous solution containing 1.70 percent by weight of polyvinylpyrrolidone having a number average molecular weight of about 160,000. The polymer solution is injected at the rate of about 300 bbl/day. Next, water having dissolved therein 0.8 weight percent of:

$C_{12}H_{25}O(CH_2CH_2O)_{10}SO_3Na$ is injected into the formation via the injection well at the rate of 300 bbl/day for about 10 days following which water is injected into the formation via the injection well at the rate of 250 bbl/day. After 50 days of water injection the rate of oil production via an adjacent production well is at a substantial rate.

EXAMPLE II

A flooding operation is carried out in an oil-containing reservoir in accordance with the process of this invention. Four injection wells are arranged in a rectangular pattern around a single centrally located production well in this system. A slug consisting of 100 barrels of an aqueous polymer solution containing 1.5 percent by weight based on the total weight of the solution of a copolymer having a number average molecular weight of about 350,000 and having about 20% by weight of recurring units of the formula:

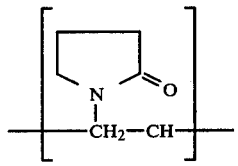

and with the balance being recurring units of the formula:

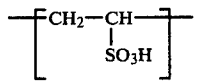

is displaced via each of the four injection wells into the formation at a rate of 50 bb/day. In the next step, 400 barrels of water containing 0.6 weight percent of a surfactant having the formula:

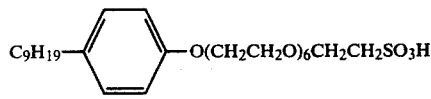

are injected under pressure into the producing formation through each injection well at a rate of about 55 bbl/day following which brine is injected into the formation at the rate of 120 bbl./day during which time oil is produced via the production well at a substantial rate.

What is claimed is:

1. A process for recovering hydrocarbons from a hydrocarbon-bearing formation penetrated by an injection well and a production well which comprises first injecting into the formation via the said injection well an aqueous solution of about 0.1 to about 4.0 weight percent of a vinylpyrrolidone polymer followed by injecting into the formation via the said injection well an aqueous solution of about 0.05 to about 5.0 weight percent of a surfactant, and finally recovering hydrocarbons via the said production well, wherein the said vinylpyrrolidone polymer is selected from the group consisting of polyvinylpyrrolidone and copolymers of vinylpyrrolidone and a material selected from the group consisting of acrylamide, acrylic acid and vinyl sulfonic acid, wherein the said vinylpyrrolidone polymer has a number average molecular weight of about 50,000 to about 1,000,000, and wherein the said surfactant is selected from the group consisting of a water-soluble petroleum sulfonate and (a) polyethoxylated alkyl benzene sulfonates having the formula:

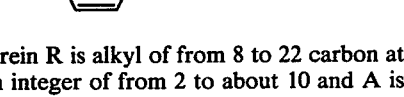

wherein R is alkyl of from 8 to 22 carbon atoms, n is an integer of from 2 to about 10 and A is selected from the group consisting of hydrogen, sodium, potassium and the ammonium ion, (b) polyethoxylated alkyl benzene sulfates having the formula:

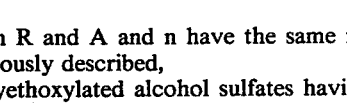

wherein R and A and n have the same meaning as previously described, (c) polyethoxylated alcohol sulfates having the formula:

$RO(CH_2CH_2O)_mSO_3A$, wherein R and A have the same meaning as previously described and m is an integer of from 2 to about 18 and (d) polyethoxylated alcohol sulfonates having the formula:

$RO(CH_2CH_2O)_{m-1}CH_2CH_2SO_3A$, wherein R, m and A have the same meaning as previously described.

2. The process of claim 1 wherein the said vinylpyrrolidone polymer is polyvinylpyrrolidone.

3. The process of claim 1 wherein the said vinylpyrrolidone polymer is a copolymer of vinylpyrrolidone and a material selected from the group consisting of acrylamide, acrylic acid and vinyl sulfonic acid.

4. The process of claim 1 wherein the said surfactant is a water-soluble petroleum sulfonate.

5. The process of claim 1 wherein the said vinylpyrrolidone polymer is a copolymer of vinylpyrrolidone and vinyl sulfonic acid.

* * * * *